United States Patent [19]
Litsche

[11] Patent Number: 5,875,165
[45] Date of Patent: Feb. 23, 1999

[54] APPARATUS FOR LOADING/UNLOADING A DATA STORAGE MEDIUM INTO/FROM A DRAWER

[75] Inventor: Mario Litsche, Backnang, Germany

[73] Assignee: Eastman Kodak Company, Rochester, N.Y.

[21] Appl. No.: 770,751

[22] Filed: Dec. 19, 1996

[30] Foreign Application Priority Data

Dec. 23, 1995 [DE] Germany .................. 195 48 541.6

[51] Int. Cl.$^6$ ................. G11B 33/02; G11B 17/04
[52] U.S. Cl. ...................... 369/77.1; 360/99.06
[58] Field of Search .............. 360/99.06, 99.02; 369/75.1, 75.2, 77.1, 77.2

[56] References Cited

U.S. PATENT DOCUMENTS

| | | | |
|---|---|---|---|
| 4,400,808 | 8/1983 | Saito et al. | 369/262 |
| 4,709,282 | 11/1987 | Tamada | 360/97 |
| 4,764,917 | 8/1988 | Sugihara et al. | 369/77.1 |
| 4,855,848 | 8/1989 | Yamada et al. | 360/96.5 |
| 5,025,339 | 6/1991 | Kanno et al. | 360/99.06 |
| 5,164,934 | 11/1992 | Kase et al. | 369/77.1 |
| 5,193,079 | 3/1993 | Ko et al. | 369/37 |
| 5,210,725 | 5/1993 | Kase et al. | 369/19 |
| 5,216,645 | 6/1993 | Sakayama | 369/36 |
| 5,467,334 | 11/1995 | Kim | 369/77.1 |
| 5,513,157 | 4/1996 | Saito et al. | 369/34 |
| 5,574,711 | 11/1996 | Nakamichi | 369/77.1 |
| 5,590,109 | 12/1996 | Ookawa et al. | 369/77.2 |
| 5,604,721 | 2/1997 | Asano | 369/34 |
| 5,610,892 | 3/1997 | Choi | 369/77.2 |

FOREIGN PATENT DOCUMENTS

| | | | |
|---|---|---|---|
| 0 424 985 | 10/1986 | European Pat. Off. | |
| 59-215067 | 12/1984 | Japan | 369/75.1 |
| 5-258440 | 10/1993 | Japan . | |
| 7-320382 | 12/1995 | Japan . | |

*Primary Examiner*—William J. Klimowicz
*Attorney, Agent, or Firm*—Raymond L. Owens

[57] ABSTRACT

Apparatus for loading/unloading a data storage medium (CD) into/from a device, comprising such apparatus having a drawer in which there is a recess shaped to match the outer contours and the thickness of the data storage medium, the device having in its outer casing an opening for the drawer such that it prevents simultaneous insertion of more than one data storage medium into the device, and a sensing device located in the vicinity of the opening in the outer casing of the device for detecting the presence of a data storage medium in the drawer.

7 Claims, 4 Drawing Sheets

APPARATUS FOR LOADING/UNLOADING A DATA STORAGE MEDIUM INTO/FROM A DRAWER

FIELD OF THE INVENTION

The invention relates to apparatus for loading/unloading a data storage medium into/from a device by means of a drawer.

BACKGROUND OF THE INVENTION

Apparatus which provides for loading and unloading data storage media such as compact discs, floppy disks or magnetic tape cassettes into/from a recording/playback or data storage device or disc changer by means of a drawer are well known.

EP-B-0 424 985 describes an apparatus for loading and unloading single data storage media, in particular compact discs (CDs), into and from a playback device in which the loading/unloading operation is performed by means of an adapter inserted into an opening in the device by hand. The adapter contains a drawer which has a recess shaped to match the outer contours and thickness of the compact disc and an opening for the drawer in the adapter which is dimensioned in such a way that if there are two compact discs (CDs) in the drawer at the same time, the second CD will foul against the lip of the opening when the drawer is inserted thus preventing more than one CD at once being inserted in the adapter and thereby in the device.

SUMMARY OF THE INVENTION

The disadvantages of the above apparatus are, firstly, the size and complexity of the adapter and, secondly, the complicated and unreliable method of handling the CD when it is inserted in the adapter/device especially since, when there is a second CD in the drawer at the same time, that second CD will either jam in or be pushed out of the drawer thus potentially resulting in damage to the CD.

It is the object of the present invention to create an apparatus of the type referred to above which, firstly, is simple, compact and economical in design and, secondly, which enables straightforward, reliable and safe loading and unloading of single data storage media within an automated environment.

In accordance with the invention, this object is achieved by an apparatus for loading/unloading a data storage medium (CD) into/from a device, comprising such apparatus having a drawer in which there is a recess shaped to match the outer contours and the thickness of the data storage medium, the device having in its outer casing an opening for the drawer such that it prevents simultaneous insertion of more than one data storage medium into the device, and sensing means located in the vicinity of the opening in the outer casing of the device for detecting the presence of a data storage medium in the drawer.

Advantageously, the sensing means includes a sensor on the device in the vicinity of the opening for the drawer and scanning marks on the drawer extending longitudinally parallel to its direction of movement such that inward and/or outward movement of the drawer and/or jamming of the drawer if it contains more than one data storage medium can be detected. Furthermore, there is at least one cut-out within the drawer recess and along the line of the scanning marks such that through it the sensor can detect the presence of a single data storage medium in the recess in the drawer.

The above objects are also achieved by an apparatus for loading/unloading a data storage medium (CD) into/from a device comprising such apparatus having a drawer in which there is a recess shaped to match the outer contours and the thickness of the data storage medium, the device having in its outer casing an opening for the drawer and means for preventing the simultaneous insertion of more than one data storage medium into the device, such preventing means including sensing means located in the vicinity of the opening in the outer casing of the device for detecting the presence in the drawer of more than one data storage medium (CD).

The sensing means includes a sensor and a movable detector means on the device in the vicinity of the opening in the device and above the recess in the drawer such that an additional data storage medium in the drawer recess which projects above the top of the drawer recess can be detected when an attempt is made to move the drawer into the device.

BRIEF DESCRIPTION OF THE DRAWING

FIG. I is a partially cutaway top view of the apparatus according to the invention, with the drawer in its initial extended position outside the device.

DETAILED DESCRIPTION OF THE PREFERRED EMBODIMENTS

The description which follows relates to an apparatus with a drawer for loading and unloading single, flat data storage media into and from a recording/playback device such as a data archiving unit or a disc changer where the data storage medium preferably takes the form of a compact disc (CD). It is obvious to a person skilled in the art that the apparatus according to the invention is equally suitable for performing the same operation with other flat data storage media having a smooth outer surface such as floppy disks, or gramophone records.

Figure 1:
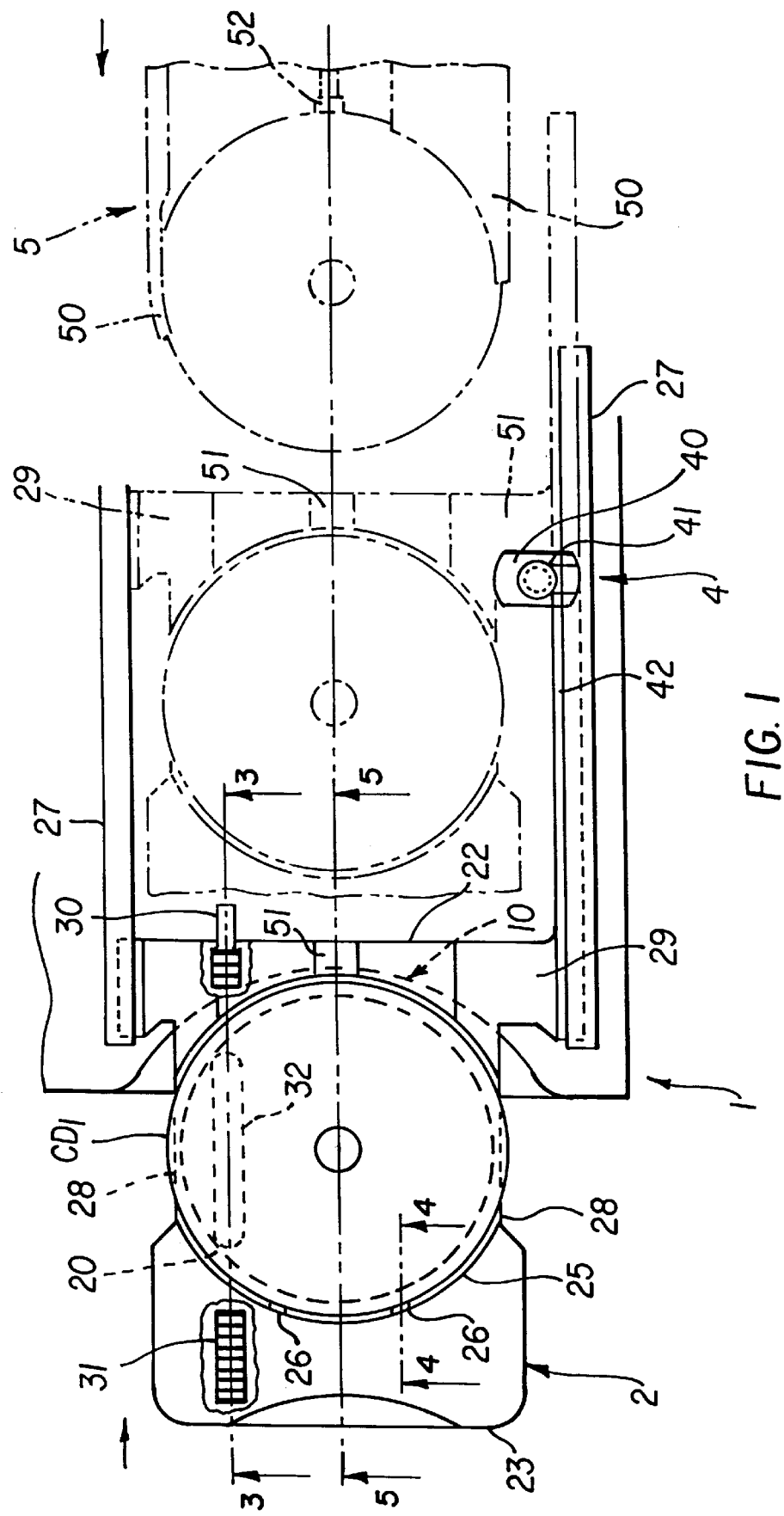

The apparatus illustrated in FIG. 1 for loading and unloading data storage media, the latter being referred to simply as compact discs or CDs from this point on, is shown in its initial position in which the loading/unloading drawer 2 is extended out of the device and contains a compact disc CD.

The apparatus which is located within the recording/playback device 1 includes, in addition to the drawer 2, of an opening 10 in the outer casing of the recording/playback device for accommodating the drawer, a sensing device 3 (See FIG. 2), a drive unit for the drawer and a gripper mechanism 5 (schematically shown) having two gripper arms 50 for removing the compact disc CD from the drawer 2 and transferring it to a CD magazine or CD drive (not illustrated).

Figure 2:
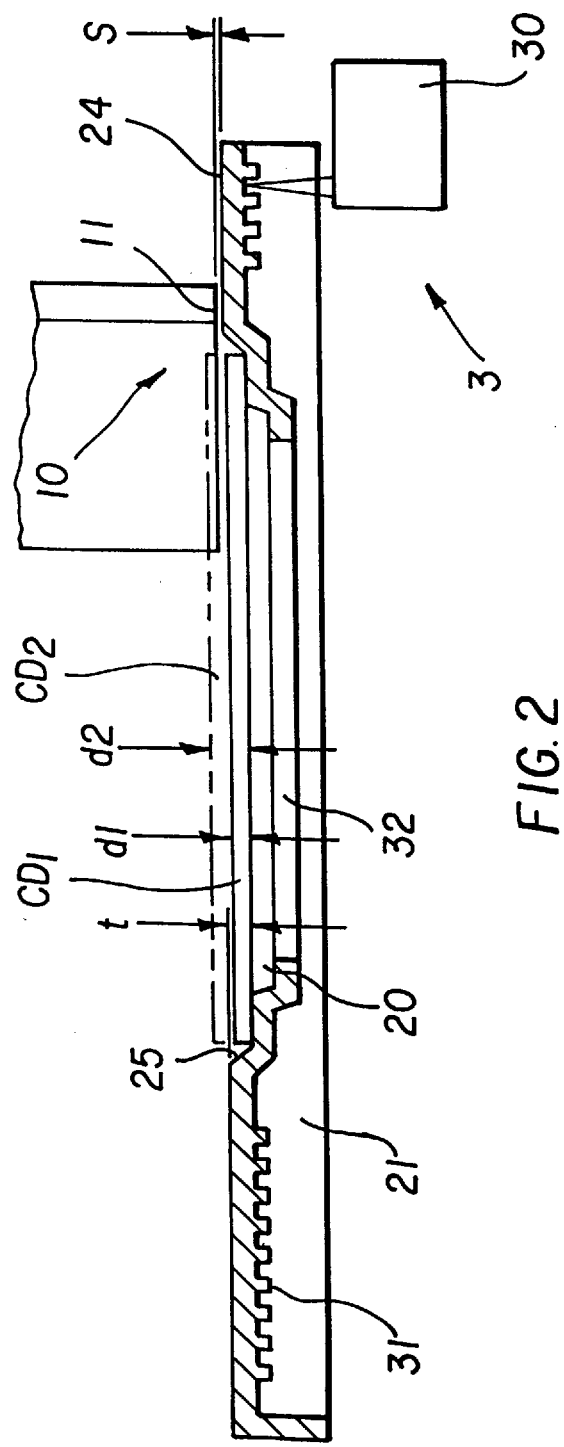
FIG. 2 is a partial view of the apparatus according to FIG. 1 seen from the side in cross-section along the line "A—A"
Figure 3:
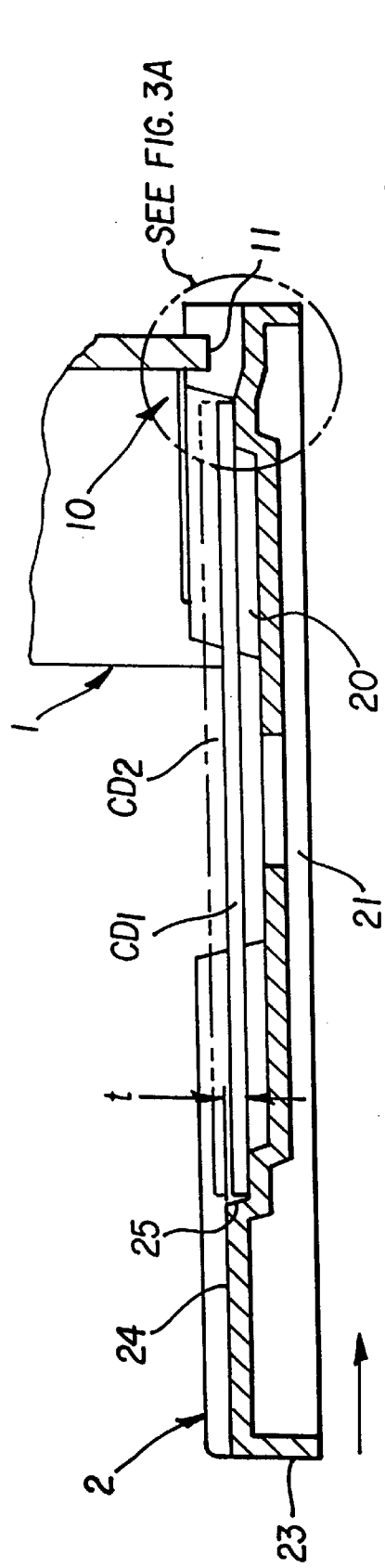
FIGS. 3 and 3A are enlarged partial views of the apparatus according to FIG. 1 seen from the side in cross-section along the line "B—B"
Figure 3A:
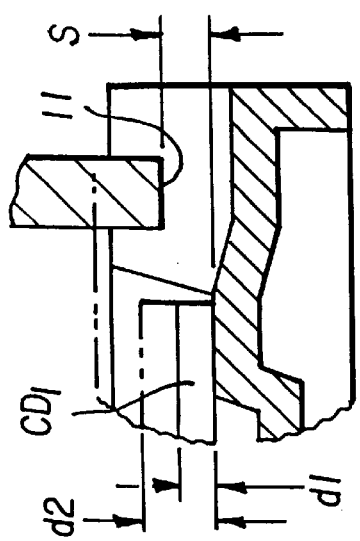
Figure 4:
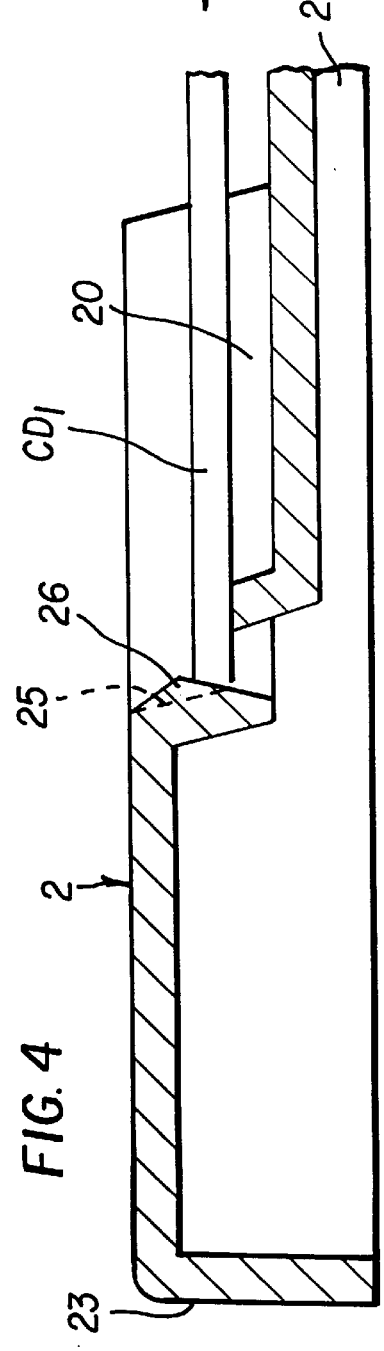
FIG. 4 is an enlarged partial view of the apparatus according to FIG. 1 seen from the side in cross-section along the line "C—C"

The drawer 2 has a recess 20 shaped to match the outer contours and the thickness of the compact disc CD, that recess 20 being, as illustrated in FIGS. 1, 2 and 3, of a depth t which is greater than the thickness d1 of a single compact disc CD1 but less than the thickness d2 of two compact discs CD1 and CD2.

The dimensions of the opening 10 in the outer case of the recording/playback device for accommodating the drawer 2 are such that more than one data storage medium cannot be introduced into the recording/playback device at the same time, the gap between the top edge 11 (See FIG. 2) of the opening 10 and the top edge or surface 24 (See FIG. 2) of the drawer recess 20 being of a width S such that if there is a second compact disc CD2 in the drawer recess and projecting above the top edge 24 of the recess, it will strike against the top edge 11 of the opening 10 when the drawer is moved inwards.

As illustrated in FIGS. 1 and 2, the sensing device 3 is located in the vicinity of the opening 10 in the outer casing of the recording/playback device, and respectively for the purposes of detecting the presence of a single and/or an additional compact disc CD in the drawer 2 and includes a sensor 30, which is positioned on the recording/playback device in the vicinity of the opening 10, and a series of scanning marks 31 on the drawer 2 extending longitudinally parallel to the direction of movement of the drawer such that inward and/or outward movement of the drawer and/or jamming of the drawer if more than one CD is present can be detected.

The scanning marks 31 take the form of a series of bars in the shape of raised ridges (FIG. 2) and/or printed lines (FIG. 1) on the underside 21 of the drawer 2 in the area of the cut-out 20 in the drawer recess, and the sensor 30 is positioned below the drawer.

Within the recess 20 or in the base of the drawer 2 and along the line of the scanning marks 31 and in alignment with the direction of movement of the drawer there is at least one cut-out 32 through which the sensor 30 can detect the presence of a single compact disc CD. The cut-out 32 is in the shape of a longitudinal slot so that it is possible to detect whether a CD with a predefined diameter is in the drawer.

The scanning marks 31 at the inner end 22 and outer end 23 of the drawer 2 differ from one another in form and/or arrangement in such a way that it is possible to detect by the sensor 30 whether the drawer is at the limit of its inward or outward travel. This involves there being fewer scanning marks 31 on the inner end 22 of the drawer than on the outer end 23 or alternatively the two sets of scanning marks being differently spaced in a manner not illustrated.

The scanning marks 31 are such that they can be scanned by an opto-electronic (conventional photo-electric cell) or magneto-electronic (conventional magneto-resistive pick-up) sensor, i.e. the scanning marks consist of raised ridges or printed lines for opto-electronic scanning or raised ridges of soft or hard magnetic material for magneto-electronic scanning.

The drawer 2 is driven by a microprocessor-controlled drive unit 4 (FIG. 1) and its speed of movement when close to the limits of its travel can be controlled in conjunction with the sensing device 3 in such a way that that the drawer can be moved at a slower speed when close to the limits of its travel than its average speed of movement thus avoiding the effects of excessive acceleration or deceleration on the drawer and the CD in it.

If the presence in the drawer of more than one compact disc CD is detected by the sensing device 3 and a microprocessor unit (not illustrated) connected to it, the loading operation of the drawer 2 driven by the microprocessor-controlled drive unit 4 and controlled by the microprocessor control unit can be paused or stopped and the drawer returned to the limit of its outward travel.

The microprocessor-controlled drive unit 4 includes, as shown in FIG. 1, of a microprocessor-controlled drive motor 40 with a drive pinion 41 which engages in a toothed rack 42 on the drawer 2, the toothed rack being parallel to one of the two guide tracks 27 on either side of the drawer and running in the direction of movement of the drawer.

The drawer 2, shown in FIG. I as a rectangular design, has cutaways 28 along its sides extending in its direction of movement and in the area of the compact disc recess 20 such that a compact disc CD can be held by its outer edges by the operator when being placed in or removed from the recess.

In addition, the drawer 2 also has recessed channels 29 between the compact disc recess 20 and the inner end 22 of the drawer on its top surface at the sides of the drawer and in line with the outer edges of a compact disc CD when placed in the drawer and along which the two gripper arms 50 of the gripper mechanism 5 can pass for the purposes of internal loading and unloading of the compact disc CD when the drawer is inside the recording/playback device at the limit of its inward travel.

Furthermore, the drawer 2 has another recessed channel 51 positioned centrally in relation to its longitudinal axis and running parallel to the recessed channels 29 for the gripper arms 50 which is provided for a locking arm 52 which grips the outer edge of the CD in order to hold it steady in the compact disc recess while it is being gripped by the gripper mechanism.

As illustrated in FIGS. 1 to 4, the recess 20 for the compact disc CD1 in the drawer 2 has a beveled edge 25 running around its upper edge beginning at the top surface of the drawer and ending at the vertical face of the recess and extending at two points on the outer side of the recess into two wedge-shaped retaining tabs 26 (FIG. 4) for the compact disc CD1 which are designed to prevent the compact disc from slipping or being pushed out of the recess when it is pushed against those retaining tabs 26 by the locking arm 52 and when the gripper mechanism 5 takes hold of it.

A second compact disc CD2 placed in the recess 20 is also prevented by those retaining tabs 26 from slipping or being pushed out of the recess if it strikes against the top edge 11 of the opening 10 when the drawer is closed.

The recording/playback device 1 has in its outer casing in the vicinity of the drawer opening 10 a recess or cavity for the drawer 2 such that the limit of inward travel of the drawer is shifted further inwards towards the gripper mechanism thereby enabling a more compact design.

The mode of operation of the apparatus is as follows:

First of all an operator places by hand a compact disc CD1 without a protective sleeve in the compact disc recess 20 in the drawer 2 which is in its initial extended position at the limit of its outward travel (FIGS. 1 and 2).

Next, on actuation of a load/eject button (not illustrated) on the recording/playback device 1, the microprocessor-controlled drive unit 4 is switched on/started and the drawer 2 moved horizontally inwards towards the inner limit of its travel, its rate of acceleration from standstill to a predetermined speed of conveyance being controlled according to a pre-programmed progression in such a way by the microprocessor control unit in conjunction with the sensing device 3 which detects the number of scanning marks on the inner end 22 of the drawer 2 that the compact disc CD1 in the drawer does not slip backwards out of the recess 20 towards the outer end 23 of the drawer. If that were to occur, the CD would either be pushed out of the drawer by striking against the top edge 11 of the drawer opening 10 or the drawer would jam as it attempted to move inwards and in either case damage to the CD could result.

As the drawer 2 continues to move inwards into the recording/playback device, the sensor 30, a photo-electric cell for example, of the sensing device 3 detects through the cut-out 32 in the compact disc recess 20 whether there is a CD in the drawer or not. If there were no CD in the drawer that information would be stored by the microprocessor control unit for the purposes of subsequent operation of the drawer, for example for use as a clearance signal for subsequent ejection/unloading of a CD from the recording/playback device.

Shortly before the drawer 2 reaches the limit of its inward travel, its speed of conveyance is reduced from its maximum to zero using a pre-programmed rate of deceleration, the number of scanning marks or the distance traveled by the drawer once again being used as a parameter for controlling its rate of conveyance. This prevents the compact disc CD1 from slipping forwards out of the drawer recess 20 in the direction of the inner end 22 of the drawer.

Once the drawer 2 has reached the limit of its inward travel controlled by the number of scanning marks 31 detected by the sensor 30, the microprocessor-controlled drive unit 4 is switched off by the microprocessor control unit. The inner and outer limits of drawer travel are identified by differing numbers of scanning marks such as raised ridges on the inner end 22 and outer end 23 of the drawer.

Subsequently, the compact disc CD1 is removed from the drawer recess 20 by means of the gripper mechanism 5 of which the gripper arms 50 are fed through the recessed side channels 29 of the drawer 2 and grip the compact disc CD1 at its outer edges and lift it out of the drawer and transfer it to a CD magazine or CD drive (not illustrated). As the compact disc CD1 is gripped by the gripper arms, the locking arm 52 of the gripper mechanism 5 pushes the CD against the two retaining tabs 26 at the edge of the drawer recess 20 thus securing it against slipping upwards out of the recess. Before the compact disc CD1 is lifted out of the drawer recess 20 by the gripper arms 50 it is released by the locking arm 52.

Finally, the drawer 2 either remains in the position (illustrated by broken lines) inside the recording/playback device I at the limit of its inward travel or is moved back out of the recording/playback device by the drive unit if the load/eject button is pressed again by the operator or a control program on the microprocessor control unit is activated, thereby enabling the procedure described above to be repeated.

In the event that two or more compact discs, e.g. CD1 and CD2, are inadvertently placed in the recess 20 of the drawer 2, when the drawer is moved into the recording/playback device, the leading edge of the top compact disc CD2 will strike against the top edge 11 of the opening 10 in the outer casing of the recording/playback device and by virtue of its trailing edge being held by the retaining tabs 26 on the lip of the drawer recess 20 it will retard and ultimately halt inward movement of the drawer. That retardation/halting of the inward movement of the drawer will be detected by the sensing device 3 in conjunction with the control unit by virtue of the control unit performing a comparison of expected and actual data on the basis of the number of scanning marks 31 detected by the sensor 30 per predetermined time period. In response to the above eventuality, the control unit is switched off and the microprocessor-controlled drive unit, preferably a conventional stepping motor, brought to a standstill so quickly that the compact disc CD2 is only lightly trapped.

Subsequently, the direction of rotation of the microprocessor-controlled drive motor 40 is reversed, the drawer 2 returned to its initial extended position at the limit of its outward travel and the microprocessor-controlled drive unit 4 brought to a standstill or switched off. A display (not illustrated) indicates to the operator that more than one CD has been placed in the drawer.

Figure 5:
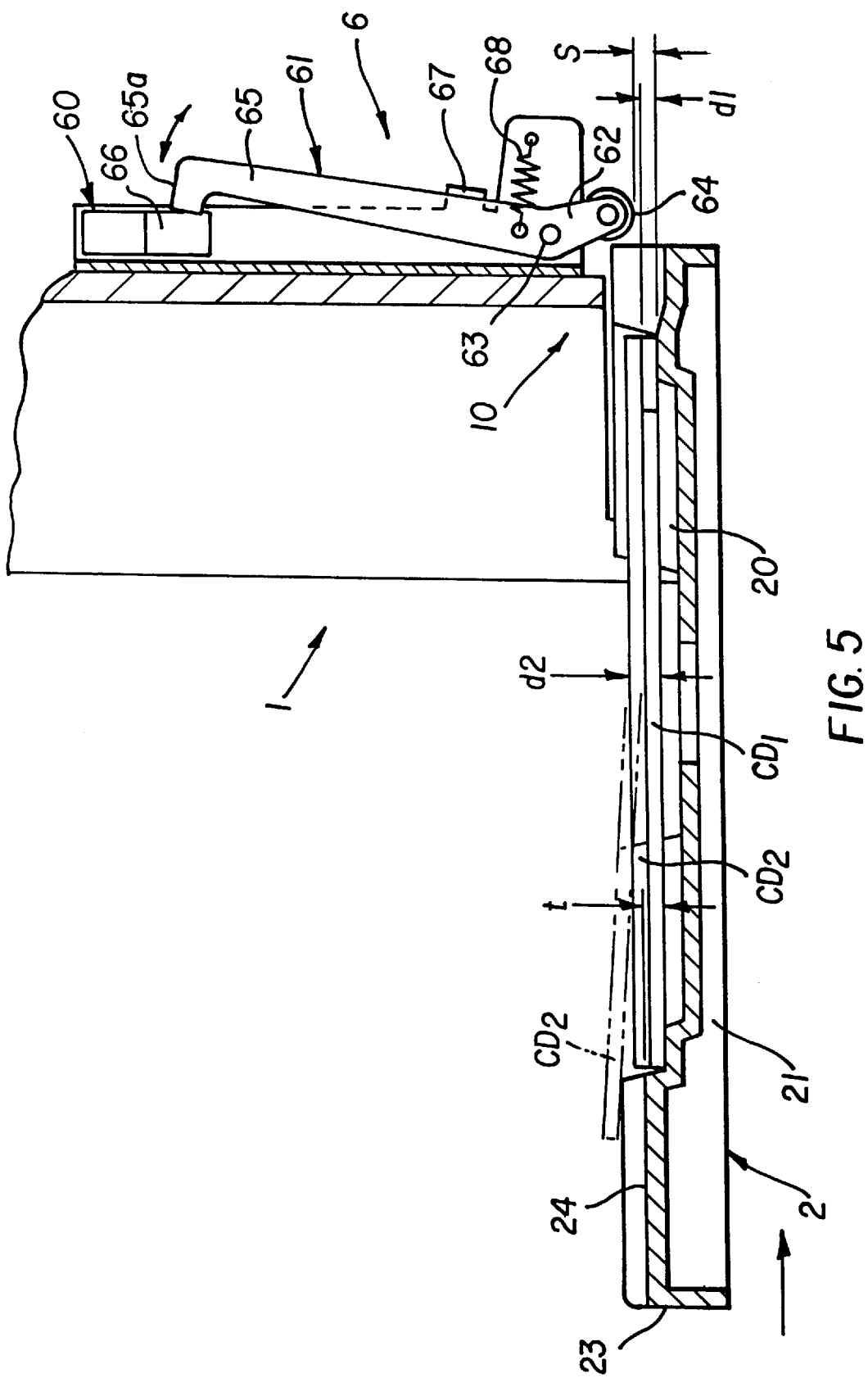
FIG. 5 is an enlarged partial view of another embodiment of the apparatus according to FIG. 1 seen from the side in cross-section along the line "B—B".

A variation of the apparatus for loading/unloading a single compact disc CD1 into/from the recording/playback device 1 and illustrated in FIG. 5 differs from the first version described above in that, firstly, the top edge 11 of the opening 10 in the outer casing of the recording/playback device does not form the upper limit of the gap S and, secondly, in that it has a different means of preventing more than one compact disc from being inserted into the recording/playback device, that means involving the use of a different sensing means 6 located in the vicinity of the drawer opening 10 for detecting the presence of more than one compact disc, e.g. CD1 and CD2, in the drawer 2.

The sensing means 6 includes in this case of a sensor 60 and a movable detector level 61 located on the recording/playback device at the opening 10 for the drawer and above the compact disc recess 20 in the drawer 2 in such a way that a second compact disc CD2 in the recess and projecting above the lip of the recess can be detected when an attempt is made to insert it into the recording/playback device by means of the drawer. The recess 20 in the drawer is of the same design as in the first version of the apparatus.

The detector lever 61 which can be moved into the scanning range 66 of a sensor 60 and whose lower end 62 protrudes into the opening 10 in the outer casing of the recording/playback device above the compact disc recess 20 in the drawer 2 in such a way that it can be moved by a second compact disc CD2 placed in the compact recess of the drawer.

The detector lever 61 is pivoted around a fulcrum 63 and has a short lower arm and a long upper arm, the short arm which forms the lower first end 62 of the lever being fitted with a roller 64 and the long arm which forms the upper second end 65 of the lever being fitted with a switch tab 65a. The detector lever 61 is held in its initial position in which it is in contact with a stop 67 either by the action of a spring 68 or by the weight distribution between its two arms.

The underside of the roller 64 and the top surface 24 of the drawer 2 form the limits of the gap S through which a compact disc placed in the recess 20 must pass.

The leading edge of a second compact disc CD2 placed in the drawer recess 20 will strike the roller 64 when the drawer 2 is moved inwards thereby moving the detector lever 61 so that its upper end 65 enters the scanning range 66 of the sensor 60. The sensitivity of the detector lever is determined by the ratio of the lower and upper arms of the lever to one another and their respective lengths.

The detector lever 61 is designed in such a way that it can be detected by an opto-electronic (conventional photo-electric cell) or magneto-electronic sensor (conventional magneto-resistive pick-up or Hall-type pick-up), i.e. the upper end 65 of the lever is made of plastic or metal for opto-electronic detection or of a soft or hard magnetic material for magneto-electronic detection.

As with the first version of the apparatus, if the presence of a second compact disc CD2 in the drawer is detected by the sensing means 6 and the microprocessor unit (not illustrated) to which it is connected, the inward movement of the drawer 2 driven by the microprocessor-controlled drive unit 4 and controlled by the microprocessor control unit can be paused or stopped and the drawer returned to the limit of its outward travel so that the second compact disc CD2 inadvertently placed in the drawer can be removed and damage to either of the compact discs CD1 or CD2 in the drawer prevented.

The method of operation of the second version of the apparatus as illustrated in FIG. 5 differs from the first version described in that as a result of the different design of sensing means 6 consisting of the sensor 60 and detector lever 61, the drawer 2 does not jam if moved inwards when a second compact disc CD2 has inadvertently been placed in the drawer recess 20.

This is due to the fact that when the drawer is moved inwards, the leading edge of the second compact disc CD2 is only pressed against the relatively weak force of the spring 68, and the detector lever 61 is only moved as far as the point at which its switch tab 65a enters the scanning range 66 of the sensor 60.

The invention has been described in detail with particular reference to certain preferred embodiments thereof, but it will be understood that variations and modifications can be effected within the spirit and scope of the invention.

Parts List
CD1 compact disc
CD2 compact disc
1 recording/playback machine
2 loading/unloading drawer
3 sensing device
4 microprocessor-controlled drive unit
5 gripper mechanism
6 sensing device
10 opening
11 top edge
20 cut-out
20 recess
21 underside
22 inner end
23 outer end
24 top edge
25 beveled edge
26 retaining tabs
27 guide tracks
28 cutaways
29 recessed channels
30 sensor
31 scanning marks
32 cut-out
40 microprocessor-controlled drive motor
41 drive pinion
42 toothed rack
50 gripper arms
51 recessed channel
Pasts List cont'd
52 locking arm
60 sensor
61 detector means
62 lower end
63 fulcrum
64 roller
65 upper end
65 a swtich tab
66 detection range
67 stop
68 spring

I claim:

1. Apparatus for loading/unloading a data storage medium (CD) into/from a device comprising such apparatus having a drawer in which there is a recess shaped to match the outer contours and the thickness of the data storage medium, the device having in its outer casing an opening for the drawer such that it prevents simultaneous insertion of more than one data storage medium into the device, and sensing means located in the vicinity of the opening in the outer casing of the device for detecting the presence of one and more than one data storage medium in the drawer, the sensing means including a single sensor on the device in the vicinity of the opening in the outer casing and scanning marks on the drawer extending longitudinally parallel to its direction of travel such that inward and/or outward movement of the drawer and/or jamming of the drawer when it contains more than one data storage medium (CD) can be detected.

2. Apparatus in accordance with claim 1, characterized in that the scanning marks take the form of a series of bars in the shape of printed lines or raised ridges on the underside of the drawer running below the drawer recess for the data storage medium (CD), and in that the sensor is located below the drawer.

3. Apparatus in accordance with claim 2, characterized in that there is at least one cut-out within the data storage medium recess in the drawer and along the line of the scanning marks through which the presence of one data storage medium (CD) in the drawer can be detected by the sensor.

4. Apparatus in accordance with claim 1, characterized in that the scanning marks at the inner end and outer end of the drawer are different so that the sensor can detect whether the drawer is at the inner or outer limit of its travel.

5. Apparatus in accordance with claim 4, characterized in that the drawer movably is movably mounted and a microprocessor-controlled drive unit is coupled to the drawer, which in response to the sensor adjusts the speed of travel of the drawer when it is close to either of its limits of travel.

6. Apparatus in accordance with claim 1, characterized in that the recess in the drawer is of a depth which is greater than the thickness of a single data storage medium (CD) but less than the thickness of two data storage medium (CD).

7. Apparatus in accordance with claim 1, characterized in that a top edge of the opening in the outer casing of the device and a top surface of the recess in the drawer are disposed to form a gap such that a second data storage medium (CD) in the drawer recess and projecting above the top surface of the recess strikes against the top edge of the opening when the drawer is moved inwards.

* * * * *